United States Patent [19]

Strangman et al.

[11] Patent Number: 4,668,579

[45] Date of Patent: May 26, 1987

[54] INTERSTITIALLY PROTECTED OXIDATION RESISTANT CARBON-CARBON COMPOSITE

[75] Inventors: Thomas E. Strangman, Phoenix, Ariz.; Robert J. Keiser, Huntsville, Utah

[73] Assignee: The United States of America as represented by the Secretary of the Air Force, Washington, D.C.

[21] Appl. No.: 576,081

[22] Filed: Feb. 1, 1984

[51] Int. Cl.[4] .................... B32B 9/00; D02G 3/00
[52] U.S. Cl. ................................ 428/367; 427/249; 427/255.2; 427/255.7; 427/402; 428/334; 428/336; 428/368; 428/408
[58] Field of Search ............ 427/249, 377, 113, 376.1, 427/122, 228, 255.2, 255.7, 419.7, DIG. 11; 428/262, 408, 101, 245, 368, 334, 336, 367, 246, 446

[56] References Cited

U.S. PATENT DOCUMENTS

| | | | |
|---|---|---|---|
| 3,369,920 | 2/1968 | Bourdeau et al. | 427/249 |
| 3,553,010 | 1/1971 | Rubisch et al. | 428/216 |
| 3,672,936 | 6/1972 | Ehrenreich | 428/408 |
| 3,677,795 | 7/1972 | Bokros et al. | 427/249 |
| 3,811,927 | 5/1974 | Joo et al. | 427/248.1 |
| 3,837,985 | 9/1974 | Chase | 428/375 |
| 3,949,126 | 4/1976 | Crawford, Jr. | 428/113 |
| 3,969,130 | 7/1976 | Bokros | 427/249 |
| 4,045,597 | 8/1977 | Debolt | 427/249 |
| 4,168,337 | 9/1979 | Maistre | 428/113 |
| 4,252,588 | 2/1981 | Kratsch et al. | 156/73.6 |
| 4,397,901 | 8/1983 | Warren | 427/249 |

Primary Examiner—Sadie L. Childs
Attorney, Agent, or Firm—Charles E. Bricker; Donald J. Singer

[57] ABSTRACT

The carbon fiber bundles in a carbon-carbon composite are protected against oxidation by coating the fiber bundles with at least one protective layer consisting of an underlayer portion of boron carbide and an overlayer portion of silicon carbide.

13 Claims, No Drawings

INTERSTITIALLY PROTECTED OXIDATION RESISTANT CARBON-CARBON COMPOSITE

RIGHTS OF THE GOVERNMENT

The invention described herein may be manufactured and used by or for the Government of the United States for all governmental purposes without the payment of any royalty.

BACKGROUND OF THE INVENTION

This invention relates to carbon-carbon composite materials. In one aspect this invention relates to carbon-carbon composite materials which are resistant to oxidation. In another aspect, this invention relates to a method for providing oxidation resistance for carbon-carbon composite materials.

Reinforced composites are used in a wide variety of applications. The best known composites are made from two-dimensional fabrics and/or fibers dispersed in a resin or plastic matrix. These composites are basically a resin or plastic structure to which reinforcing fabrics or fibers have been added to enhance the physical properties of the structure.

Advances in the field of aerospace technology have created a need for high strength, temperature-resistant materials. For many applications, this need is satisfied by carbon-carbon composite materials. These materials utilize a carbon matrix, as opposed to a resin or plastic matrix.

A wide range of multidirectional reinforced composite structures are now available. The simplest of these structures is obtained by stacking unidirectional fibers or sheets with alternating layers oriented in different directions, or by stacking woven sheets. More complex structures provide three-dimensional reinforcement. The simplest of the three-dimensional structures is the three-directional (3D) structures which generally has reinforcing elements which are mutually orthogonal. The most complex three-dimensional structure is a thirteen-directional (13D) structure. The thirteen directions, with reference to a cube, form three subgroups; the three edges, the four long diagonals, and the six diagonals of the faces.

The reinforced carbon-carbon composite structures are fabricated from graphite or carbon yarn or rods. The term yarn includes continuous filament yarns and yarns spun from short fibers, and comprises a plurality of filaments or fibers combined to make up a desired end count. Rods are produced by a pultrusion process whereby unidirectional groups of carbon or graphite yarn are assembled and impregnated with a thermosetting or thermoplastic resin or binder. The impregnated yarn groups are drawn through a die which is warmed to a desired temperature and which has a suitable shape.

The carbon or graphite yarns or rods are assembled into the desired geometric structure. If desired, the yarn may be impregnated with a suitable resin or binder prior to assembly.

The composite is formed either by sintering the reinforcement structure by solidifying the impregnated precursor, thereby avoiding the requirement for other materials, or by the dry or the liquid process, or by a combination of these methods. The dry process consists of depositing pyrolytic carbon inside the structure of the reinforcement by decomposition of a hydrocarbon gas such as methane. In the liquid process, the porous texture of the reinforcement is impregnated with a thermosetting resin or a thermoplastic carbon precursor, such as a phenolic resin, a furanyl resin, coal tar pitch, or the like, that is converted to carbon by heat treatment. Following carbonization, the structure is graphitized. The impregnation, carbonization, graphitization cycle is repeated as often as necessary to densify the composite to a desired degree.

The process of densification of the composite generally comprises heat treatment at a temperature in the range of 2500° to 3000° C. and may include isostatic pressing at pressures up to about 15,000 psi in an oxygen-free environment.

Many applications for carbon-carbon composites have been proposed or implemented. The use of such composites for re-entry heat shield applications has been demonstrated. Ehrenreich, U.S. Pat. No. 3,672,936, discloses disk brake pads made of such composites. The use of these materials for turbine disk and blade components, for propulsion system nozzles, thrust chambers, and ramjet combustion liners, and for re-entry vehicle nosetip applications has been investigated.

In the presence of an inert atmosphere, carbon has a sublimation point in excess of 3500° C. When heated in excess oxygen, carbon burns at about 400° C. For certain applications an allowable amount of wasting away due to combustion can be designed into the structure. For example, a re-entry vehicle heat shield is intended for a useful life of one cycle. For other applications, use and multiple re-use may be desired, in which case wasting away is to be avoided.

Oxidation resistance can be provided for carbon or graphite materials by depositing silicon over the carbon. Rubisch, U.S. Pat. No. 3,553,010, discloses that flame injection applied silicon reacts with the carbon of the underlying body forming silicon carbide when the operational temperature of the protected parts exceeds about 550° C., which leads to a protective layer of silicon carbide which exhibits oxidation resistance at a relatively high temperature. When heated in the presence of oxygen, the silicon carbide is converted to silicon dioxide which has a softening temperature of about 1700° C.

The protective layer of silicon carbide is highly flaw sensitive. If this protective layer is breached, the underlying carbon fibers can be quickly oxidized at temperatures below 1700° C. due to the inability of the silica layer to flow and seal the ends of the damaged fibers. Breach of the silicon carbide layer may occur during use of the composite structure, as for example during high stress maneuvering periods of missiles, or it may occur during densification following application of the silicon carbide layer, as when pressure and/or temperature changes are inadvertently done too rapidly. Rapid thermal transients induced during component use can also be a major cause of cracking due to the thermal expansion difference between carbon and silicon carbide. Accordingly, what is desired is a protective coating capable of providing oxidation resistance for a carbon-carbon composite, which coating is also capable of flowing into and sealing a damaged area.

Accordingly, it is an object of the present invention to provide an improved oxidation resistant coating for a carbon-carbon composite material.

Another object of the present invention is to provide a method for protecting the fiber bundles in a carbon-carbon composite against oxidation Other objects and advantages of the present invention will be apparent to those skilled in the art from a reading of the following detailed disclosure of the invention as well as the appended claims.

SUMMARY OF THE INVENTION

In accordance with the present invention there is provided a multidirectional carbon-carbon composite having at least one layer of a protective coating deposited on the carbon fiber bundles of the composite, wherein the protective layer consists of an underlayer portion of boron carbide and an overlayer portion of silicon carbide.

Also provided in accordance with the invention is a method for providing oxidation resistance for the carbon fiber bundles in a multidimensional carbon-carbon composite which comprises coating the bundles with at least one layer of a protective coating which consists of an underlayer portion of boron carbide and an overlayer portion of silicon carbide.

DETAILED DESCRIPTION OF THE INVENTION

The method of this invention is applicable to any multidimensional carbon-carbon composite structure, ranging from 2-D through and including 13-D. 3-D structures generally comprise multiple layers of woven carbon or graphite fiber, or multiple layers of unidirectional fibers or sheets with alternating layers oriented in different directions, with each layer bonded to the next adjacent layer. The more complex composite structures, i.e., 3-D through 13-D, comprise multiple reinforcing carbon or graphite yarn bundles or rods arranged in multiple directions ranging from mutually orthogonal up to all possible edge and diagonal directions of a cube, with each bundle or rod bonded to every adjacent bundle or rod. All these structures are well known in the art.

In carrying out the method of this invention, the composite structure is assembled in accordance with procedures known in the art, then processed to form a free-standing structure. In the prior art it is known to form a carbon-carbon composite by sintering the assembled reinforcement structure by solidifying an impregnated precursor, thereby avoiding the requirement for other materials, or by the dry or liquid process, or by a combination of these methods. The dry process consists of providing deposition of pyrolytic carbon inside the structure of the reinforcement by decomposition of a hydrocarbon gas, such as methane. In the liquid process, the porous texture of the reinforcement is impregnated with a thermosetting resin or a thermoplastic carbon precursor, such as a phenolic resin, a furanyl resin, coal tar pitch, or the like, that is converted to carbon by heat treatment. The impregnation and carbonization cycle is repeated as often as necessary to densify the composite to a desired degree.

One method of processing, disclosed by Stover, U.S. Pat. No. 4,201,611, consists of first heating an assembled 3-D billet in vacuum to a temperature of 1500° C. to remove the PVA coating found in commercially available fibers. CVD infiltration is then conducted by heating the billet in an atmosphere containing methane at 0.001 to 0.003 atm pressure for a total of 80 hours at a temperature of 1050°–1100° C. to apply approximately one micron coating thickness on the fibers. The billet is then impregnated with coal tar pitch, placed in an autoclave and heated to 250° C. The pressure is raised to 15,000 psi and temperature is raised to 650° C. at 15,000 psi pressure. Following this procedure, the billet is graphitized at 1 atm pressure to 2700° C. This processing cycle is repeated 3 or 4 times for a total processing cycle of 4 or 5.

Another method of processing, disclosed by Stover, U.S. Pat. No. 4,400,421, consists of impregnating an assembled preform with pitch at about 1 atm pressure. The impregnated preform is heated at a controlled rate at about 650° to 725° C. at about 15,000 psi pressure. The thus-baked impregnated preform is then graphitized at about 1 atm pressure and a temperature of about 2300° C. or 2750° C. The impregnation, baking and graphitization cycle is repeated as necessary to achieve a desired density. Finally, the graphitized structure is subjected to a heat treatment by heating to about 1500° C. for about 4 hours.

The method of the present invention comprises coating the fiber bundles in a multidirectional carbon-carbon composite with at least one protective layer consisting of an underlayer portion of boron carbide and an overlayer portion of silicon carbide. At least one of these protective layers is applied after initial consolidation of an assembled preform and prior to complete densification of the composite structure. Preferably, the protective layer is applied immediately following the consolidation step.

The protective layer may, however, be applied after the structure has been partially densified. Following application of the protective layer of layers, densification of the matrix structure can be completed by infiltration of additional carbonaceous material.

As discussed previously, consolidation of a carbon-carbon structural preform can be accomplished by sintering the impregnated preform, or by the dry or liquid process. Of these, the dry process, i.e., high temperature decomposition of a hydrocarbon gas, is presently preferred, because this method is most likely to leave the pore voids open. The thickness of the resulting layer of pyrolytic carbon can also be closely controlled. In general, the thickness of such layer can be in the approximate range of 0.5 to 5 microns.

The first underlayer portion of boron carbide is applied to the consolidated preform using CVD (chemical vapor deposition) in which the consolidated preform is heated in an atmosphere containing a mixture of a decomposable boron compound having a melting point below about 100° C., such as boron hydride, a boron halide or the like, and a decomposable hydrocarbon gas, such as methane, ethane, or the like, at about 0.001 to 0.003 atm pressure for about 48 to 96 hours at a temperature of 1000°–1200° C. to apply approximately a 0.5 to 5 micron coating thickness to the fiber bundles. The second overlayer portion of silicon carbide is applied in the like manner using a mixture of a decomposable silicon compound having a melting point below about 100° C., such as silicon hydride, silicon tetrahalide, or the like, and a decomposable hydrocarbon gas, such as methane, ethane, or the like, under similar conditions to apply a coating thickness of approximately 0.5 to 5 microns. If desired, additional alternating underlayer portions of boron carbide and silicon carbide may be applied over the initial protective layer, up to a maximum of about 10 layers. Following application of the protective layer or layers, densification of the composite may be continued or completed.

The densified composite is generally machined to a desired configuration. Following such machining, it is desirable to apply at least one layer of silicon carbide to the exposed surfaces of the machined composite to provide a surface oxidation barrier. Inasmuch as fiber ends are exposed by machining, it is preferable to apply at least one protective layer of this invention, i.e., an underlayer portion of boron carbide and an overlayer portion of silicon carbide, to a machined composite.

The interstitial coating of silicon carbide and boron carbide is intended to protect the fiber bundles of a carbon-carbon multidirectional composite by healing any damage associated with cracks which penetrate through the surface protective layer of silicon carbide. Under oxidizing conditions, at high temperature, the silicon carbide is converted to silicon dioxide which has a melting temperature of about 1712° C. This temperature is greater than the temperatures normally encountered by the carbon-carbon structural components under operating conditions. Consequently, should the composite fracture at the surface, under normal operating conditions, the silicon dioxide cannot flow to seal the ends of the damaged fibers.

Under oxidizing conditions the boron carbide and silicon carbide protective layer is converted to boron oxide and silicon dioxide. The boron oxide melts at 450° C. and combines with the silicon dioxide to form a low melting borosilicate glass which can rapidly seal an affected area. It will be appreciated that the borosilicate glass will form only if the composite is fractured or the outer silicon carbide layer or overlayer portion is cracked, and only if oxygen is present to oxidize the boron carbide and the silicon carbide.

Various modifications of the present invention may be made without departing from the spirit and scope of the appended claims.

We claim:

1. A multidirectional carbon-carbon composite having from one to ten layers of a protective coating deposited on the carbon fiber bundles of said composite, each of said layers consisting of an underlayer portion of boron carbide and an overlayer portion of silicon carbide, wherein the thickness of each portion of said protective coating is in the approximate range of 0.5 to 5 microns.

2. The composite of claim 1 further comprising a layer of pyrolytic carbon between said carbon fiber bundles and said protective coating layer.

3. The composite of claim 1 further comprising carbonaceous material over said protective coating.

4. The composite of claim 1 wherein the number of layers of said protective coating is one.

5. A densified composite in accordance with claim 1 further comprising a surface protective layer of silicon carbide.

6. A method for protecting the carbon fiber bundles in a multidirectional carbon-carbon composite against oxidation which comprises coating an assembled composite with from one to ten layers of a protective coating, each layer consisting of an underlayer portion of boron carbide, and an overlayer portion of silicon carbide, wherein the thickness of each portion of said protective coating is in the approximate range of 0.5 to 5.0 microns.

7. The method of claim 6 wherein said protective layer is applied to the fiber bundles in said composite.

8. The method of claim 6 wherein said protective layer is applied to a consolidated composite having a layer of pyrolytic carbon over the fiber bundles of said composite.

9. The method of claim 8 wherein said composite is further densified.

10. The method of claim 9 wherein the resulting densified composite is provided with a surface coating of silicon carbide.

11. The method of claim 6 wherein said boron carbide underlayer portion is formed by heating a consolidated preform in an atmosphere containing a mixture of a decomposable boron compound having a melting point below about 100° C., and a decomposable hydrocarbon gas, under deposition conditions.

12. The method of claim 6 wherein said silicon carbide overlayer portion is formed by heating a consolidated preform in an atmosphere containing a mixture of a decomposable silicon compound having a melting point below about 100° C., and a decomposable hydrocarbon gas, under deposition conditions.

13. The method of claim 10 wherein said surface coating is applied by heating a densified composite in an atmosphere containing mixture of a decomposable silicon compound having a melting point below about 100° C., and a decomposable hydrocarbon gas, under deposition conditions.

* * * * *